(12) United States Patent
Zhu et al.

(10) Patent No.: US 12,360,275 B2
(45) Date of Patent: Jul. 15, 2025

(54) METHOD FOR MONITORING HYDRAULIC FRACTURING RANGE OF SURFACE VERTICAL SHAFT

(71) Applicants: UNIVERSITY OF SCIENCE AND TECHNOLOGY BEIJING, Beijing (CN); NORTH CHINA INSTITUTE OF SCIENCE AND TECHNOLOGY, Langfang (CN); BEIJING ANKE TECHNOLOGY CO., LTD., Beijing (CN)

(72) Inventors: Sitao Zhu, Beijing (CN); Xiaoguang Shang, Beijing (CN); Xiufeng Zhang, Beijing (CN); Longkai Hao, Beijing (CN); Chao Wang, Beijing (CN); Huadong Xie, Beijing (CN); Gang Yao, Beijing (CN); Shidong Li, Beijing (CN); Tao Zhou, Beijing (CN); Jinhai Liu, Beijing (CN); Xuyou Wang, Beijing (CN); Yitong Huang, Beijing (CN); Jiajie Li, Beijing (CN); Quande Wei, Beijing (CN)

(73) Assignees: University of Science and Technology Beijing, Beijing (CN); North China Institute of Science and Technology, Langfang (CN); Beijing Anke Technology Co., Ltd., Beijing (CN)

( * ) Notice: Subject to any disclaimer, the term of this patent is extended or adjusted under 35 U.S.C. 154(b) by 450 days.

(21) Appl. No.: 17/900,125

(22) Filed: Aug. 31, 2022

(65) Prior Publication Data
US 2023/0140874 A1 May 11, 2023

(30) Foreign Application Priority Data
Nov. 11, 2021 (CN) .......................... 202111353934.X

(51) Int. Cl.
*G01V 1/40* (2006.01)
*E21B 43/26* (2006.01)
(Continued)

(52) U.S. Cl.
CPC ................ *G01V 1/40* (2013.01); *E21B 43/26* (2013.01); *E21C 41/18* (2013.01); *G01V 1/288* (2013.01)

(58) Field of Classification Search
CPC .... G01V 1/42; G01V 1/40; G01V 2210/1234; G01V 2210/1299; G01V 2210/646; G01V 2210/123; E21B 43/26; E21C 41/18
See application file for complete search history.

(56) References Cited

U.S. PATENT DOCUMENTS 9,772,414 B2 * 9/2017 Diller ...................... G01V 1/288
10,760,416 B2 * 9/2020 Weng ...................... G01V 1/288

OTHER PUBLICATIONS

Zhu et al., "Rock Burst Mechanism under Coupling Action of Working Face Square and Regional Tectonic Stress," Shock and Vibration, vol. 2021, No. 1. Wiley, Jan. 2021 (Year: 2021).*

(Continued)

*Primary Examiner* — Daniel R Miller

(57) ABSTRACT

A method for monitoring hydraulic fracturing range of a surface vertical shaft is provided by the present disclosure, belonging to the technical field of ultrahigh-pressure hydraulic fracturing monitoring of the coal mine vertical shafts. The method comprises the following steps: connecting, by an eight-thread communication cable, a high-precision portable micro-seismic monitoring acquisition instrument to a high-sensitivity deep hole sensor, and performing uphole-crosshole-downhole monitoring simultaneously, specifically as follows: providing uphole-crosshole-downhole monitoring holes respectively, and installing deep hole geophones in the monitoring holes; then laying communication cables uphole-crosshole-downhole to connect the geophones to the (Continued)

portable high-precision micro-seismic acquisition instrument respectively; then performing high-precision positioning on the fissure development range by monitoring recorded events and time, thus determining the directions and ranges of a main fracture and secondary induced fractures of hydraulic fractures.

5 Claims, 3 Drawing Sheets

(51) Int. Cl.
    *E21C 41/18*    (2006.01)
    *G01V 1/28*    (2006.01)

(56) References Cited

OTHER PUBLICATIONS

B. Wang, S. Zhu, F. Jiang, J. Liu, X. Shang, and X. Zhang, "Investigating the Width of Isolated Coal Pillars in Deep Hard-Strata Mines for Prevention of Mine Seismicity and Rockburst," Energies, vol. 13, No. 17. MDPI AG, p. 4293, Aug. 19, 2020 (Year: 2020).*

C. Wei, C. Zhang, I. Canbulat, A. Cao, and L. Dou, "Evaluation of current coal burst control techniques and development of a coal burst management framework," Tunnelling and Underground Space Technology, vol. 81. Elsevier BV, pp. 129-143, Nov. 2018 (Year: 2018).*

Q. Zhu, Y. Feng, M. Cai, J. Liu, and H. Wang, "Interpretation of the extent of hydraulic fracturing for rockburst prevention using micro-seismic monitoring data," Journal of Natural Gas Science and Engineering, vol. 38. Elsevier BV, pp. 107-119, Feb. 2017 (Year: 2017).*

H. Duan and L. Zhao, "Prevention Technology for Strong Mine Pressure Disaster in the Hard-Roof Large-Mining-Height Working Face," Shock and Vibration, vol. 2020. Hindawi Limited, pp. 1-15, Oct. 21, 2020 (Year: 2020).*

\* cited by examiner

METHOD FOR MONITORING HYDRAULIC FRACTURING RANGE OF SURFACE VERTICAL SHAFT

CROSS REFERENCE TO RELATED APPLICATIONS

This patent application claims the benefit and priority of Chinese Patent Application No. 202111353934.X, filed on Nov. 11, 2021, the disclosure of which is incorporated by reference herein in its entirety as part of the present application.

TECHNICAL FIELD

The present disclosure relates to the technical field of ultrahigh-pressure hydraulic fracturing monitoring of coal mine vertical shafts, and in particular relates to a method for monitoring hydraulic fracturing range of a surface vertical shaft.

BACKGROUND

In recent years, some mining areas in China are affected by mining tremor caused by the fracturing of key strata, causing concern and panic among the government and residents. The main geological feature of such mining tremor is that there are single or multiple thick and hard key strata within a few hundred meters above the mining layer, and the sudden fracturing and rotation of these thick and hard key strata with large-area hanging roofs cause a large energy mine pressure event throughout the mining area. This is an increasingly prominent safety and production hazard for mining areas and has become one of the key issues faced by mine production in some areas of China.

Ultrahigh-pressure hydraulic fracturing technology for surface vertical shafts of the coal mine overlying thick and hard key strata is one of the effective measures to solve the above problems. The hydraulic fracturing for the surface vertical shaft is implemented on the thick and hard key strata above the working face to make hydraulically fractured fissures fully develop in three dimensions of length, width and height of the thick and hard key strata, such that the thick and hard rock strata are pre-split, and the integrity of the thick and hard rock strata is destroyed, thus cutting off the conditions of large-area hanging roofs, fracturing and rotation of the thick and hard key strata.

In the prior art, a micro-seismic monitoring method for a downhole hydraulically fractured fissure propagation rule of a coal mine is disclosed, which comprises the following steps: providing a plurality of monitoring holes in arranged fracturing holes and arranging seismometers, and connecting signals of all seismometers into the same monitoring station; performing fracturing operation and collecting fracturing information; and inversing a spatial position of each micro-seismic event in the surrounding rock based on the micro-seismic information. This monitoring method aims at the regular propagation of downhole hydraulically fractured fissures, but does not consider the influence of the overlying strata of the coal seam on the fractured fissures, as well as not involve the combined uphole and downhole monitoring, leading to low detection precision. In addition, a coal rock hydraulically fractured fissure micro-seismic positioning and propagation mechanism monitoring method is disclosed in the prior art, which comprises the following steps: arranging a micro-seismic sensor according to actual conditions to collect original waveform signals in a fracturing process, screening out, by defining waveform sensitive values, effective micro-seismic events induced by hydraulic fracturing of the coal rock, and calculating a position of a fracturing source; and meanwhile, inversing a seismic source mechanism according to the waveform information, thus obtaining the propagation law of the hydraulically fractured fissures. In accordance with this method, the micro-seismic sensor is used to perform micro-seismic monitoring in the tunnel construction process, the positioning is conducted according to rock mass fracture micro-seismic events to obtain the rock mass micro-seismic events for positioning. The applied method is more suitable for positioning the micro-seismic center, but is not applicable to the downhole construction of the coal mine. In addition, an uphole-downhole micro-seismic monitoring system and method are disclosed in the prior art. It is proposed to add an uphole micro-seismic monitoring system on the surface to make the whole downhole including a monitoring area be in three-dimensional monitoring, which may effectively improve the monitoring precision of downhole micro-seismic events in the vertical direction. The applied method is suitable for finding the micro-seismic occurrence position, but the monitoring for the fracturing development range is not detailed enough.

The development effect of fractured fissures in the thick and hard key strata is the key for solving the problem of mining tremor. At present, the commonly used means for monitoring hydraulically fractured fissures are often borrowed from the petroleum field (acoustic, displacement, micro-seismic, etc.), which are costly and difficult to handle, and are not fully suitable for monitoring the fissures developed from ultrahigh-pressure hydraulic fracturing on the surface vertical shaft of the coal mine overlying thick and hard key strata. Therefore, the present disclosure intends to provide a high-precision and portable monitoring method, which monitors the fissure development effect of the fractured well by monitoring the seismic wave generated by the development of the fractured fissures of the thick and hard key strata based on the portable high-precision micro-seismic acquisition instrument.

SUMMARY

The technical problem to be solved by the present disclosure is to provide a method for monitoring hydraulic fracturing range of a surface vertical shaft.

The method comprises the following steps:

S1: taking a wellhead of an ultrahigh-pressure hydraulically fractured well as an original point, drilling surface monitoring holes having a diameter of 90 mm, for installing micro-seismic deep hole geophones, at intervals of 50 m according to a direction of a working face strike towards a cutting hole, wherein a total of three monitoring holes are drilled, namely, a 1 # surface monitoring hole, a 2 # surface monitoring hole, and a 3 # surface monitoring hole respectively;

S2: drilling three surface monitoring holes in a propelling direction of the surface fracturing hole towards the working face according to the same drilling method as S1, namely, a 4 # surface monitoring hole, a 5 # surface monitoring hole, and a 6 # surface monitoring hole, S3: implementing two monitoring holes in directions of vertical working face strikes on the two sides of the wellhead of the ultrahigh-pressure hydraulically fractured well by adopting the same method as S1, namely, a 7 # surface monitoring hole, and a 8 # surface monitoring hole, wherein the 7 # surface monitoring hole and the 8 # surface monitoring hole are both 60 m away from the wellhead of the ultrahigh-pressure hydraulically fractured well, and drilling depths of which are 20 m and 30 m, respectively;

S4: taking the wellhead of the ultrahigh-pressure hydraulically fractured well as the original point, constructing a monitoring well at a distance of 130 m from the strike of the working face, and placing geophones between key strata;

S5: drilling downhole monitoring holes at an inclination of 75° to the coal wall in the working face cutting hole and a solid coal gateway, and installing micro-seismic deep hole geophones at the hole bottoms, each downhole monitoring hole having a hole depth of 25 m; providing the downhole monitoring holes at intervals of 50 m in a track gateway direction and a transport gateway direction, with four downhole monitoring holes in each direction;

S6: after the normal installation of the micro-seismic deep hole geophones is ensured, laying a communication cable from the micro-seismic deep hole geophones to the surface portable high-precision micro-seismic monitoring system and a communication cable from the micro-seismic deep hole geophones to the downhole portable high-precision micro-seismic monitoring system uphole and downhole, respectively;

S7: communicating the surface portable high-precision micro-seismic monitoring system and the downhole portable high-precision micro-seismic monitoring system with the micro-seismic deep hole geophones and debugging the micro-seismic deep hole geophones, thus ensuring that the geophones are normal and the wire connection sequence is correct;

S8: accurately measuring orifice coordinates of each micro-seismic deep hole geophone and calculating the coordinates of the micro-seismic deep hole geophone, and inputting the coordinates into the correspondingly connected portable high-precision micro-seismic monitoring system; and S9: testing the fracturing effect, after the hydraulic fracturing starts, performing monitoring by the surface portable high-precision micro-seismic monitoring system and the downhole portable high-precision micro-seismic monitoring system at the same time, performing micro-seismic event accurate positioning according to the micro-seismic event and time of each micro-seismic deep hole geophone recorded by the portable high-precision micro-seismic monitoring system, thus obtaining the development range of fractured fissures.

After the monitoring hole in the step S1 is flushed with clear water, accumulated water in the hole is pumped out, then the hole is sealed with cement and then is cemented with a 1.5 m casing. The drilling depths of the 1 # surface monitoring hole, the 2 # surface monitoring hole and the 3 # surface monitoring hole are 20 m, 30 m and 25 m, respectively.

In the step S2, the drilling depths of the 4 # surface monitoring hole (9), the 5 # surface monitoring hole and the 6 # surface monitoring hole are 25 m, 20 m and 30 m, respectively. In the step S3, the drilling depths of the 7 # surface monitoring hole and the 8 # surface monitoring hole are 20 m and 30 m, respectively.

The installing heights of the micro-seismic deep hole geophones in the 1 # surface monitoring hole, the 2 # surface monitoring hole, the 3 # surface monitoring hole, the 4 # surface monitoring hole, the 5 # surface monitoring hole, the 6 # surface monitoring hole, the 7 # surface monitoring hole and the 8 # surface monitoring hole are the hole depths.

In the step S8, the coordinates of the micro-seismic deep hole geophone are accurate to two places behind a decimal point to guarantee the accuracy of later-period positioning.

The technical solutions of the present disclosure have the beneficial effects as follows:

In accordance with the above technical solutions, the propagation range of the fractured fissures of the ultrahigh-pressure hydraulically fractured well of the coal mine is jointly monitored uphole-crosshole-downhole on the basis of the portable high-precision micro-seismic monitoring acquisition instrument to guarantee the effect hydraulically fracturing the thick and hard key strata by ultrahigh pressure. The development range of the ultrahigh-pressure hydraulically fractured fissures may be effectively monitored to obtain the fracturing effect on the thick and hard key strata. Such method is a technology which is portable, economical, high in monitoring precision, and low-cost.

Figure 1:
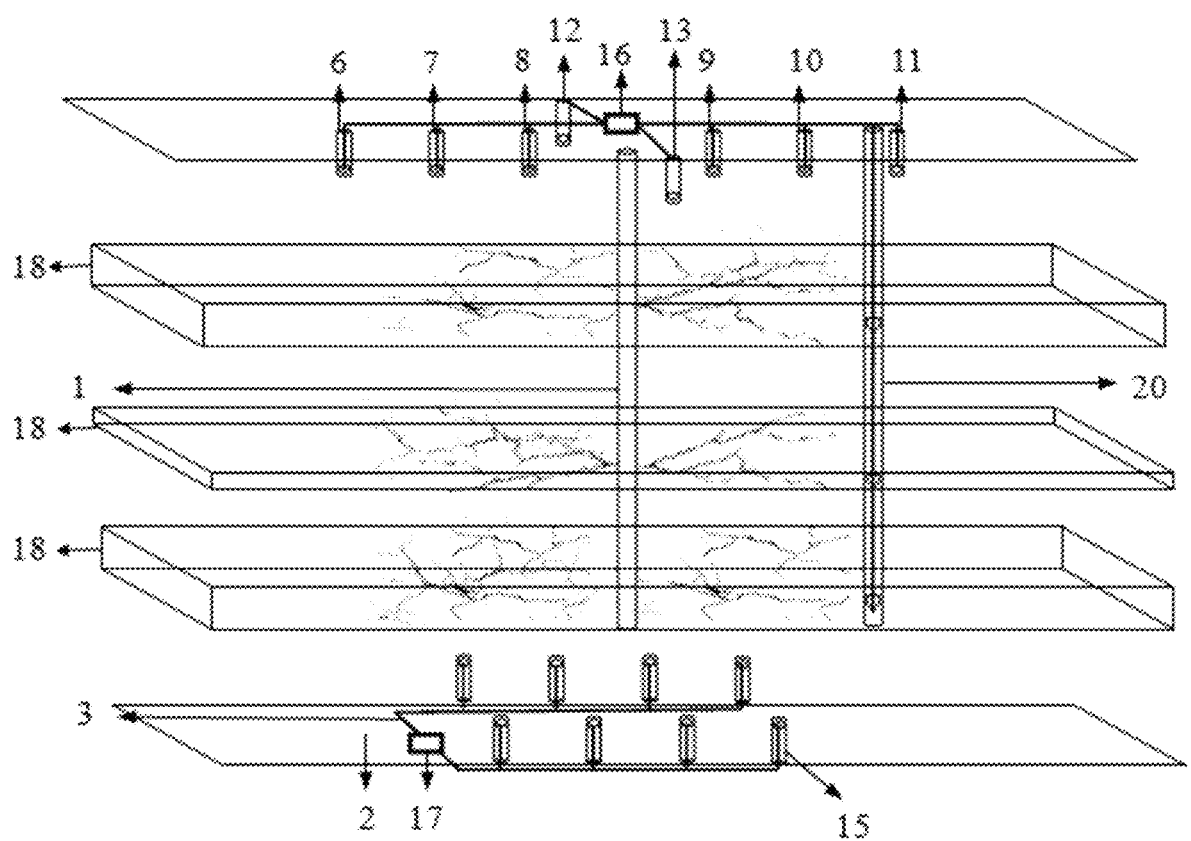
FIG. 1 is a process layout diagram of a method for monitoring hydraulic fracturing range of a surface vertical shaft in accordance with the present disclosure.

In the drawings: 1—ultrahigh-pressure hydraulically fractured well; 2—working face; 3—cutting hole; 4—cement; 5—casing; 6—1 # surface monitoring hole; 7—2 # surface monitoring hole; 8—3 # surface monitoring hole; 9—4 # surface monitoring hole; 10—5 # surface monitoring hole; 11—6 # surface monitoring hole; 12—7 # surface monitoring hole; 13—8 # surface monitoring hole; 14—micro-seismic deep hole geophone; 15—downhole monitoring hole; 16—surface portable high-precision micro-seismic monitoring system; 17—downhole portable high-precision micro-seismic monitoring system; 18—thick and hard key stratum; 19—communication cable; 20—monitoring well; 21—roadway.

DETAILED DESCRIPTION

To make the technical problems to be solved by the present disclosure, the technical solutions and advantages more clearly, the following describes the present disclosure in detail with reference to the accompanying drawings and specific embodiments.

The present disclosure provides a method for monitoring hydraulic fracturing range of a surface vertical shaft, which monitors the fissure development effect of the fractured well by monitoring the seismic wave generated by the development of the fractured fissures of the thick and hard key strata based on the portable high-precision micro-seismic acquisition instrument.

Figure 3:
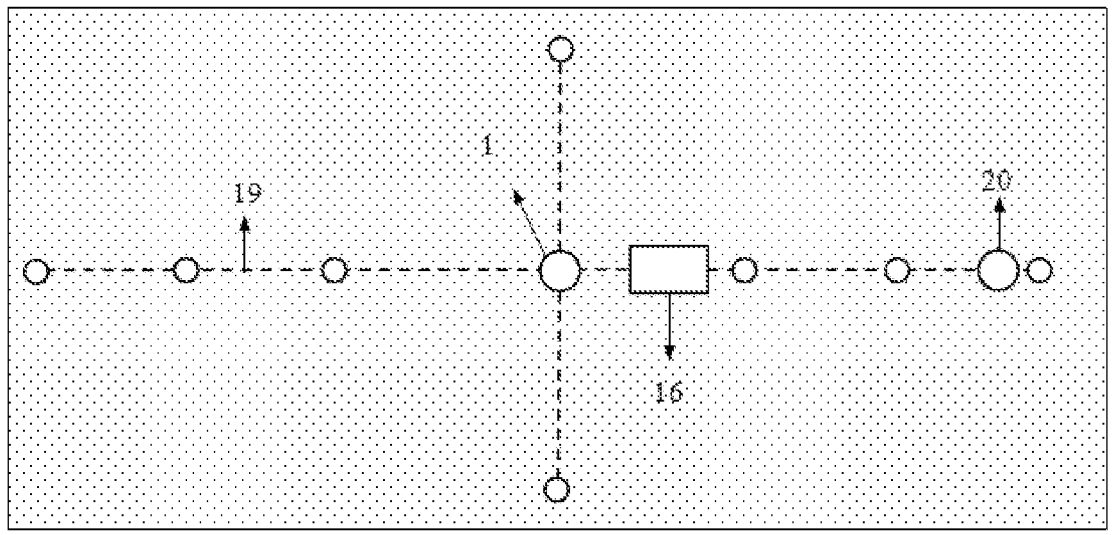
FIG. 3 is a process layout diagram of a surface portable micro-seismic acquisition monitoring system in accordance with the present disclosure.
Figure 4:
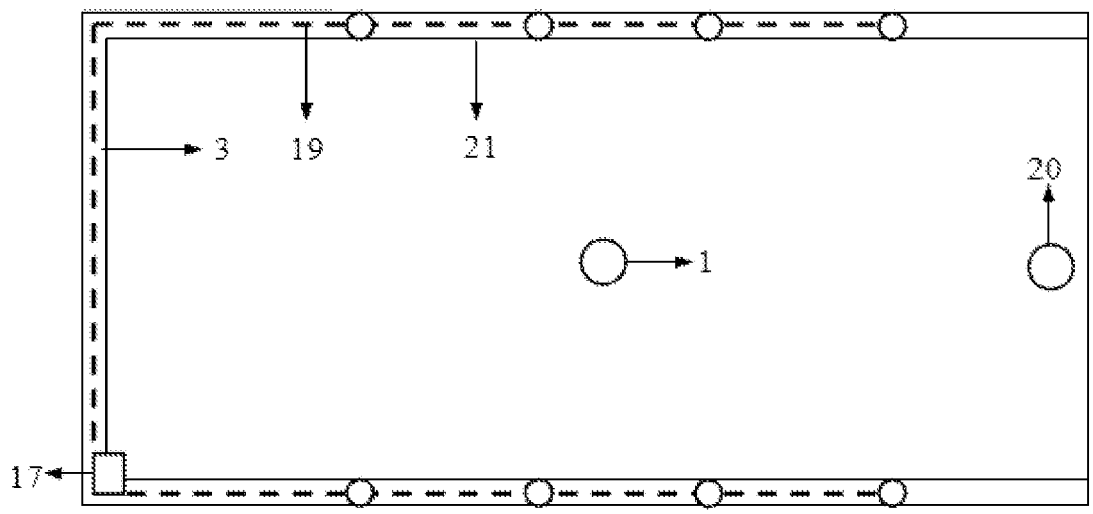
FIG. 4 is a process layout diagram of a downhole portable micro-seismic acquisition monitoring system in accordance with the present disclosure.

As shown in FIG. 1, the method comprises the following steps:

S1: taking a wellhead of an ultrahigh-pressure hydraulically fractured well 1 as an original point, drilling surface monitoring holes having a diameter of 90 mm, for installing micro-seismic deep hole geophones, at intervals of 50 m according to a direction of a working face strike towards a cutting hole 3, wherein a total of three monitoring holes are drilled, namely, a 1 # surface monitoring hole 6, a 2 # surface monitoring hole 7, and a 3 # surface monitoring hole 8 respectively;

S2: drilling three surface monitoring holes in a propelling direction of the surface fracturing hole towards the working face according to the same drilling method as S1, namely, a 4 # surface monitoring hole 9, a 5 # surface monitoring hole 10, and a 6 # surface monitoring hole 11;

S3: implementing two monitoring holes in directions of vertical working face strikes on the two sides of the wellhead of the ultrahigh-pressure hydraulically fractured well 1 by adopting the same method as S1, namely, a 7 # surface monitoring hole 12, and a 8 # surface monitoring hole 13, wherein the 7 # surface monitoring hole 12 and the 8 # surface monitoring hole 13 are both 60 m away from the wellhead of the ultrahigh-pressure hydraulically fractured well 1, and drilling depths of which are 20 m and 30 m, respectively;

S4: taking the wellhead of the ultrahigh-pressure hydraulically fractured well 1 as the original point, constructing a monitoring well 20 at a distance of 130 m from the strike of the working face, and placing geophones between key strata; so far, the layout of the completed surface portable micro-seismic acquisition and monitoring system is as shown in FIG. 3.

S5: drilling downhole monitoring holes 15 at an inclination of 75° to the coal wall in the working face cutting hole 3 and a solid coal gateway, and installing micro-seismic deep hole geophones at the hole bottoms, each downhole monitoring hole 15 having a hole depth of 25 m; providing the downhole monitoring holes 15 at intervals of 50 m in a track gateway direction and a transport gateway direction, with four downhole monitoring holes 15 in each direction;

S6: after the normal installation of the micro-seismic deep hole geophones is ensured, laying a communication cable 19 from the micro-seismic deep hole geophones to the surface portable high-precision micro-seismic monitoring system and a communication cable 19 from the micro-seismic deep hole geophones to the downhole portable high-precision micro-seismic monitoring system 17 uphole and downhole, respectively;

S7: communicating the surface portable high-precision micro-seismic monitoring system 16 and the downhole portable high-precision micro-seismic monitoring system 17 with the micro-seismic deep hole geophones and debugging the micro-seismic deep hole geophones, thus ensuring that the geophones are normal and the wire connection sequence is correct;

S8: accurately measuring orifice coordinates of each micro-seismic deep hole geophone and calculating the coordinates of the micro-seismic deep hole geophone, and inputting the coordinates into the correspondingly connected portable high-precision micro-seismic monitoring system; and S9: testing the fracturing effect, after the hydraulic fracturing starts, performing monitoring by the surface portable high-precision micro-seismic monitoring system and the downhole portable high-precision micro-seismic monitoring system at the same time, performing micro-seismic event accurate positioning according to the micro-seismic event and time of each micro-seismic deep hole geophone recorded by the portable high-precision micro-seismic monitoring system, thus obtaining the development range of fracturing fissures.

Figure 2:
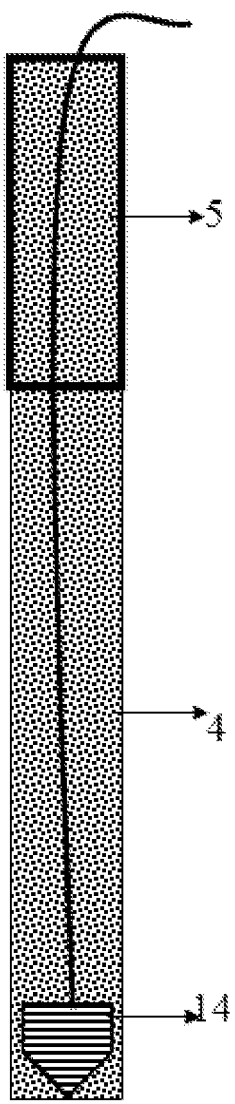
FIG. 2 is a process layout diagram of a surface micro-seismic monitoring hole in accordance with the present disclosure.

As shown in FIG. 2, after the monitoring hole in the step S1 is flushed with clear water, accumulated water in the hole is pumped out, then the hole is sealed with cement 4 and then is cemented with a 1.5 m casing 5, and the drilling depths of the 1 # surface monitoring hole 6, the 2 # surface monitoring hole 7 and the 3 # surface monitoring hole 8 are 20 m, 30 m and 25 m, respectively.

In the step S2, the drilling depths of the 4 # surface monitoring hole 9, the 5 # surface monitoring hole 10 and the 6 # surface monitoring hole 11 are 25 m, 20 m and 30 m, respectively. In the step S3, the drilling depths of the 7 # surface monitoring hole 12 and the 8 # surface monitoring hole 13 are 20 m and 30 m, respectively.

The installing heights of the micro-seismic deep hole geophones in the 1 # surface monitoring hole 6, the 2 # surface monitoring hole 7, the 3 # surface monitoring hole 8, the 4 # surface monitoring hole 9, the 5 # surface monitoring hole 10, the 6 # surface monitoring hole 11, the 7 # surface monitoring hole 12 and the 8 # surface monitoring hole 13 are the hole depths.

In the step S8, the coordinates of the micro-seismic deep hole geophone are accurate to two places behind a decimal point to guarantee the accuracy of later-period positioning.

The installation of each monitoring hole geophone is specifically described as follows:

Before installing the geophone, the geophone is debugged in advance to ensure that the to-be-installed micro-seismic deep hole geophone may operate normally. After being installed, each geophone is connected to the portable high-precision micro-seismic acquisition instrument for another wave testing to ensure the normal operation of each micro-seismic deep hole geophone again.

The foregoing is the preferred embodiment of the present disclosure, and it should be noted that for those of ordinary skill in the art, several improvements and modifications may be made without departing from the principles of the present disclosure, all of which should also be considered to be the scope of protection of the present disclosure

The invention claimed is:

1. A method for monitoring hydraulic fracturing range of a surface vertical shaft, comprising the following steps:

S1: taking a wellhead of an ultrahigh-pressure hydraulically fractured well as an original point, drilling three surface monitoring holes having a diameter of 90 mm at intervals of 50 m according to a strike of a working face towards a cutting hole, namely, a 1 # surface monitoring hole, a 2 # surface monitoring hole and a 3 # surface monitoring hole, and installing a micro-seismic deep hole geophone in each of the 1 #2 # and 3 # surface monitoring holes;

S2: drilling three surface monitoring holes having a diameter of 90 mm at intervals of 50 m from the original point in a propelling direction of the working face, namely, a 4 # surface monitoring hole, a 5 # surface monitoring hole, and a 6 # surface monitoring hole, and installing a micro-seismic deep hole geophone in each of the 4 #, 5 # and 6 # surface monitoring holes;

S3: implementing two monitoring holes having a diameter of 90 mm in directions vertical to the strike of the working face on two opposing sides of the wellhead of the ultrahigh-pressure hydraulically fractured well, namely, a 7 # surface monitoring hole and a 8 # surface monitoring hole, wherein the 7 # surface monitoring hole and the 8 # surface monitoring hole are both 60 m away from the wellhead of the ultrahigh-pressure hydraulically fractured well, and drilling depths of which are 20 m and 30 m, respectively, and installing a micro-seismic deep hole geophone in each of the 7 #, and 8 # surface monitoring holes;

S4: taking the wellhead of the ultrahigh-pressure hydraulically fractured well as the original point, constructing a monitoring well at a distance of 130 m from the strike of the working face, and installing micro-seismic deep hole geophones in the monitoring well between key strata;

S5: drilling downhole monitoring holes at an inclination of 75° to a coal wall in the cutting hole and a solid coal gateway, and installing micro-seismic deep hole geophones at hole bottoms of the downhole monitoring holes, each downhole monitoring hole having a hole depth of 25 m; providing four of the downhole monitoring holes at intervals of 50 m in each of a track gateway direction and a transport gateway direction;

S6: laying a communication cable from the micro-seismic deep hole geophones to a surface portable micro-seismic monitoring system and laying a communication cable from the micro-seismic deep hole geophones to a downhole portable micro-seismic monitoring system;

S7: communicating the surface portable micro-seismic monitoring system and the downhole portable micro-seismic monitoring system with the micro-seismic deep hole geophones and debugging the micro-seismic deep hole geophones, thus ensuring that the micro-seismic deep hole geophones are normal and a wire connection sequence is correct;

S8: measuring orifice coordinates of each micro-seismic deep hole geophone and calculating coordinates of each micro-seismic deep hole geophone, and inputting the calculated coordinates into the surface portable micro-seismic monitoring system and the downhole portable micro-seismic monitoring system correspondingly connected; and S9: testing a fracturing effect, after a hydraulic fracturing starts, performing monitoring by the surface portable micro-seismic monitoring system and the downhole portable micro-seismic monitoring system at the same time, performing micro-seismic event positioning according to the micro-seismic event and time of each micro-seismic deep hole geophone recorded by the surface portable micro-seismic monitoring system and the downhole portable micro-seismic monitoring system, thus obtaining the hydraulic fracturing range of fractured fissures.

2. The method for monitoring hydraulic fracturing range of the surface vertical shaft according to claim 1, wherein after the surface monitoring holes in the step S1 are flushed with clear water, accumulated water in the surface monitoring holes is pumped out, then the surface monitoring holes are sealed with cement and then cemented with 1.5 m casings, and the drilling depths of the 1 # surface monitoring hole, the 2 # surface monitoring hole and the 3 # surface monitoring hole are 20 m, 30 m and 25 m, respectively.

3. The method for monitoring hydraulic fracturing range of the surface vertical shaft according to claim 1, wherein in the step S2, the drilling depths of the 4 # surface monitoring hole, the 5 # surface monitoring hole and the 6 # surface monitoring hole are 25 m, 20 m and 30 m, respectively.

4. The method for monitoring hydraulic fracturing range of the surface vertical shaft according to claim 1, wherein the installing heights of the micro-seismic deep hole geophones in the 1 # surface monitoring hole, the 2 # surface monitoring hole, the 3 # surface monitoring hole, the 4 # surface monitoring hole, the 5 # surface monitoring hole, the 6 # surface monitoring hole, the 7 # surface monitoring hole and the 8 # surface monitoring hole are the respective hole depths.

5. The method for monitoring hydraulic fracturing range of the surface vertical shaft according to claim 1, wherein in the step S8, the calculated coordinates of each micro-seismic deep hole geophone are accurate to two places behind a decimal point to guarantee the accuracy of later-period positioning.

* * * * *